Nov. 24, 1925.

J. S. VALENTINE 1,563,121

CONFECTION MOLD

Filed April 13, 1925

INVENTOR:
JAMES S. VALENTINE

By Clew H Lloyd
ATTY.

Patented Nov. 24, 1925.

1,563,121

UNITED STATES PATENT OFFICE.

JAMES S. VALENTINE, OF CHICAGO, ILLINOIS.

CONFECTION MOLD.

Application filed April 13, 1925. Serial No. 22,604.

*To all whom it may concern:*

Be it known that I, JAMES S. VALENTINE, a citizen of the United States, residing at Chicago, in the county of Cook and State of Illinois, have invented new and useful Improvements in Confection Molds, of which the following is a specification.

The present invention has to do with instrumentalities for containing confections during the process of freezing and includes in addition to a mold unit or member the combination of such member and a drain adapted to co-operate therewith to measure the material contents contained in each individual mold in such unit. The apparatus illustrated in the accompanying drawing comprises such members, one adapted to act conjointly with the other in the steps leading to the production of frozen confections upon a commercial basis.

Among the objects of the invention are the following:—

A novel structure for a mold unit facilitating its co-operation with a drain unit;

The combination with a mold unit of a drain member adapted to serve as a gauging element;

The facilitation of the charging of a mold unit with the elimination of unsanitary overflow from the molds, keeping such molds free from adhering syrup and dirt during manipulation, and admitting of their being placed in brine for refrigeration;

The elimination of an independent funnel member for the mold unit and the provision of means for emptying excess material contained in individual molds;

Novel means brought about by the cooperation of a mold unit and a drain pan whereby uniform confections may be obtained in a battery of mold members without the employment of discharge or leveling vents; and A novel combination of a drain cooperating with a mold member to determine the fluid contents of individual molds in such member and comprising a removable drain section adapted to be readily cleansed.

These objects, and such other objects as may hereinafter appear, are obtained by the novel construction, combination, and arrangement of the several elements which constitute the complete device, one embodiment of the invention being illustrated in the accompanying drawing, hereby made a part of this specification and in which:—

Figure 2:
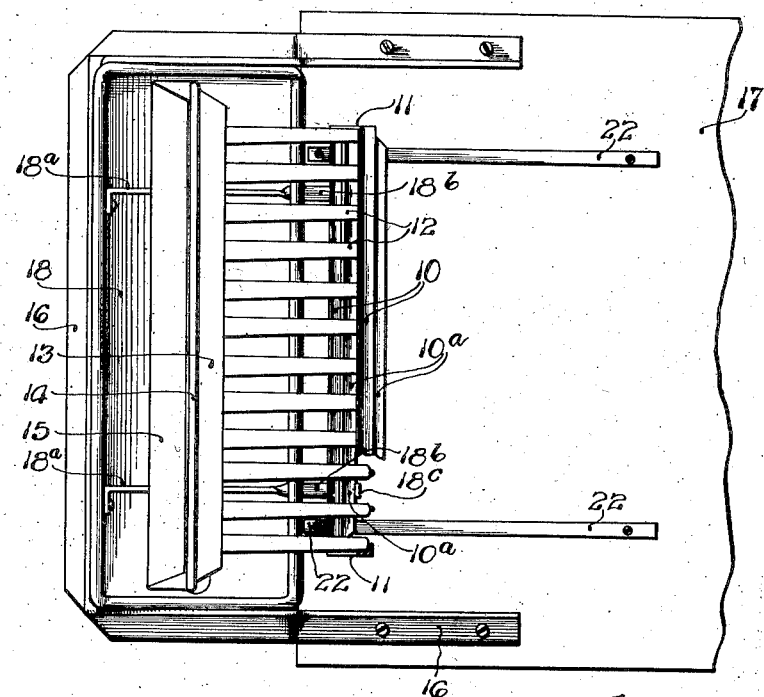
Figure 1:
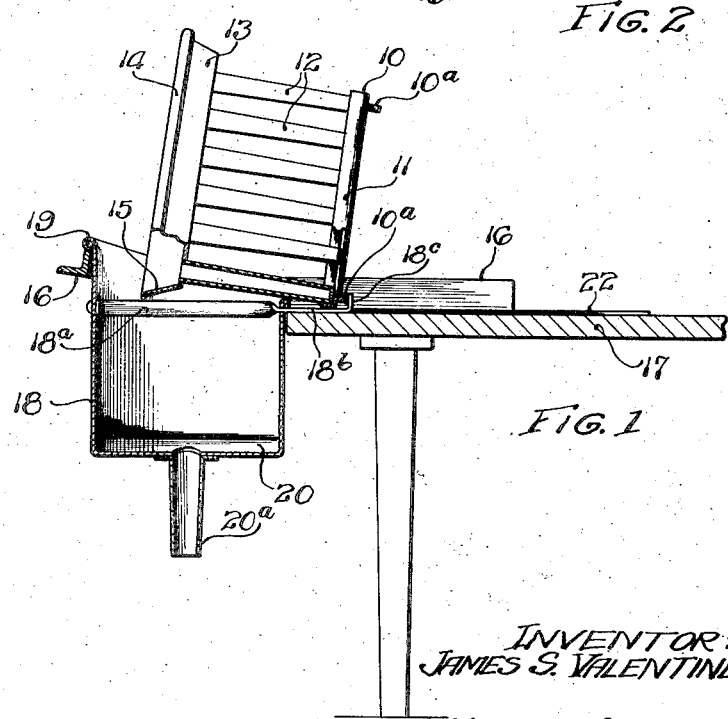

Figure 1 is an end elevation, partly in section, of said mold member and drain, the mold member being in the same position as illustrated in Figure 2; and Figure 2 is a top view of the mold and drain member, the mold member being in leveling position.

Like reference characters are used to designate similar parts in the drawing and in the description which follows.

The mold unit employed will be described first. Such unit comprises a bottom frame formed from side members 10 and end members 11. Beneath the bottom frame are two runners having ends like sled runners, designated 10ª, and for facilitating movement of the unit about a hardening room.

A plurality of slightly tapered tubes 12 in regular arrangement are suitably fastened to the frame formed of members 10 and 11. Disposed upon the top of mold tubes 12 is a dished member 13 having on three sides marginal flanges 14 substantially vertical, and on the remaining side, a pouring lip 15 co-extensive with the length of the side and of the same height as the flanges 14 but of considerably greater angularity.

Pan 13 is provided with a plurality of apertures registering with the round tops of tubes 12, and adjacent each of such apertures, the material of pan 13 may be depressed to facilitate rapid distribution into said tubes 12 of material poured into said pan 13. Tubes 12 are soldered to pan 13 or otherwise securely affixed thereto, the jointure being such that the contents of tube 12, after freezing, may be dumped out without interference because of the engagement of the molded article with the material of pan 13.

A frame 16 of angle iron is affixed to the top of a table or bench 17 to receive a removable drain or gutter 18. The frame 16 comprises two parallel sections flatly disposed upon table 17, two parallel upwardly inclined short sections, and a section extending between the outer ends of said last mentioned sections and slightly greater in dimension than the drain pan. Drain pan 18 is adapted to be seated in frame 16 intermediate the parallel upturned sections, and such drain pan 18 is of such a width that it is supported on its outer margin by the frame 16 and upon its inner side by the edge of table 17, and by cross bars 18ª extending through the inner wall of said gutter or drain pan 18. Said bar members 18ª are of strap metal with their narrow edges uppermost within the confines of pan 18, and just adjacent to the inner edge thereof, twisted as noted in Figure 2, to provide a projecting extension portion 18ᵇ having a hook or upright extremity 18ᶜ. The broad portions of sections 18ᵇ rest upon the table 17.

The margin of pan 18 is preferably beaded at 19 for reinforcement and to provide better engagement with frame 16. The bottom 20 of said pan 18 slopes downwardly toward one end adjacent which a drain pipe 20ª is disposed. This facilitates quick draining of said pan 18.

Transversely of the body of pan 18 in parallel horizontal position are two or more cross members 18ª previously described. These members should be carefully secured in horizontally parallel relation for they provide a rest for the mold unit. The position of said members 18ª in pan 18 determines the volume of liquid retained in each of tubes 12 when a mold unit is being made ready for refrigeration. Additionally, their narrow edges are uppermost in pan 18 to reduce splashing.

Upon the table 17 are placed two strap members 22 comprising a strip of metal adapted to be secured to the top of table 17 just to one side of the extensions 18ᵇ. Said members 22 provide a rest for the rear runner 10ª preventing damage to table 17 and are useful should a runner 10ª when the pan 18 is being tilted to carry out a draining off operation from such of the tubes 12 as may have been overfilled, accidentally slip over hook end 18ᶜ. Upright ends 18ᶜ determine the relative position to be given to a mold unit in order to have the excess liquid therein poured from lip 15 flow wholly within the drain 18 and to leave behind equally filled individual molds 12. Resisting as they do backward pressure or stress impressed upon a mold unit, these members facilitate rapid and accurate disposition of any excess material emptied into tubes 12 during their concurrent filling operation.

The usual method of employing the device is substantially as follows. A mold unit is brought into juxtaposition to a hose member connected to a tank containing flavored material, or to a large vessel having a pouring spout. The unit may well rest upon bars 22, or upon bars 22 and section 18ᵇ. Material is distributed from the hose or vessel among the tubes 12 as nearly equally as possible. The depression of a portion of material about each tube opening facilitates rapid filling of such tubes. An excess of flavored material is invariably poured into pan 13.

The mold unit just filled is next disposed with one runner 10ª upon the runners or guides 18ᵇ, if this has not already been done, and forced backwardly thereupon as far as said runner 10ª impinging vertical sections 18ᶜ will permit. Prior to tilting the mold units the operator should place a receiving vessel (not shown) beneath the drain mouth 20ª. The mold unit is tilted upwardly somewhat slowly, with the runner 10ª in engagement with hook ends 18ᶜ. The excess material from the pan 13 and the overfilled tubes 12 will run out and over the lip 15 into drain pan 18. From said pan the excess will flow to a receiving vessel just previously mentioned. Such excess material may be used for future fillings of the mold unit. The mold unit is tilted upwardly until the lip 15 rests upon the cross bars 18ª. These are vertically disposed to avoid or reduce splashing. It is desirable to allow the mold unit to remain in its emptying position until any disturbance in the fluid levels in tubes 12 due to a too rapid manipulation of the mold shall have subsided. As all of the tubes 12 will be disposed in the same angular relation, each by the process described will be equally filled with flavored material, and any excess of material will be poured off into the drain 18 in the manner hereinabove described.

The mold is replaced in horizontal position on the straps 22, and if sticks are to be used in the confection, these are now inserted, one in each tube 12. The mold unit is next removed to a hardening room or to a brine tank for congelation by refrigeration of the contents of each of the tubes 12. When sufficiently frozen to become thoroughly solidified, the frozen confections produced in the apparatus and by the method described are removed from the tubes 12 by dipping the mold unit quickly into hot water whereby the tubes 12 are warmed, causing surface melting of the frozen confection. This action facilitates rapid and easy dumping of the confections from said tubes 12. The fact that said tubes 12 are tapered materially aids rapid unloading of the mold unit.

A mold unit will remain immaculately clean during use as to all of its exterior portions. There is no overflow of syrup from the mold which is adapted to cover the external parts thereof with a sticky viscuous material which will gather dirt. Brine solution may be used for refrigeration without fear of dilution from material adhering to the mold unit, and the contents of the tubes 12 cannot be damaged because there is no leveling vent therein. Altogether an economical, wholly sanitary, and accurate means for measuring and containing the material used producing frozen confections is provided.

I claim:

1. An article of manufacture suitable for containing liquid material adapted to be congealed by refrigeration comprising a plurality of cylinders closed at their lower ends and having their mouths secured to a common funnel, and said funnel having a bottom section opening into said cylinders and upstanding sides, one of said sides having a relatively greater angle with respect to said bottom to provide a discharge lip for said funnel.

2. An article of manufacture as described in claim 1, and in which said lip has a predetermined angle, and is provided with an edge adapted to impinge an external object to provide for the simultaneously complete discharge of said funnel and the partial discharge of each of said cylinders to provide means for equalizing the fluid content retained in each of said cylinders.

3. A frame adapted to be secured to a fixed object to provide a seat with end portions, and a spill drain adapted to be removably disposed in said seat and comprising a body, an outlet pipe, and cross members projecting therefrom to provide added supports for said drain.

4. A spill drain comprising a main vessel, a discharge therefrom, and cross members projecting therethrough, and a frame adapted to engage said drain about three sides thereof and to be secured to a fixed object, said projecting cross members engaging upon said fixed object to support the remaining side of said drain.

5. A new article of manufacture comprising a vessel having a high and a low side, ends, a bottom having an outlet opening, and cross members intermediate said sides, a U-shaped frame adapted to engage the upper margins of said ends and said high side and to be secured to a fixed object to provide a seat from which said drain may be removed, the transverse members upon said drain extending through said lower side thereof to engage upon said fixed object.

JAMES S. VALENTINE.